(12) United States Patent
Wang et al.

(10) Patent No.: US 12,250,361 B2
(45) Date of Patent: Mar. 11, 2025

(54) OPTICAL ASSEMBLIES FOR SHARED EXPERIENCE

(71) Applicant: Apple Inc., Cupertino, CA (US)

(72) Inventors: Paul X. Wang, Cupertino, CA (US); Jeremy C. Franklin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/219,040

(22) Filed: Jul. 6, 2023

(65) Prior Publication Data

US 2024/0064280 A1  Feb. 22, 2024

Related U.S. Application Data

(60) Provisional application No. 63/399,175, filed on Aug. 18, 2022.

(51) Int. Cl.
H04N 13/344 (2018.01)
H04N 13/194 (2018.01)
H04N 13/243 (2018.01)
H04N 13/383 (2018.01)

(52) U.S. Cl.
CPC ......... H04N 13/344 (2018.05); H04N 13/194 (2018.05); H04N 13/243 (2018.05); H04N 13/383 (2018.05)

(58) Field of Classification Search
CPC .............. H04N 13/344; H04N 13/194; H04N 13/243; H04N 13/383; G02B 27/0176
USPC ......................................................... 348/53
See application file for complete search history.

(56) References Cited

U.S. PATENT DOCUMENTS

| 6,212,020 | B1 | 4/2001 | Ahlgren et al. |
| 6,424,321 | B1* | 7/2002 | Ronzani ............. G02B 27/0176 345/87 |
| 9,857,590 | B2 | 1/2018 | Hall, Jr. |
| 10,209,522 | B2 | 2/2019 | Gallery et al. |
| 10,268,888 | B2* | 4/2019 | Osterhout ............. H04N 23/661 |

(Continued)

FOREIGN PATENT DOCUMENTS

| EP | 2634617 A1 | 9/2013 |
| EP | 3381310 B1 | 10/2019 |

OTHER PUBLICATIONS

Indian Office Action from Indian Patent Application No. 202314054591, dated Mar. 26, 2024, 5 pages.

(Continued)

Primary Examiner — Gims S Philippe
(74) Attorney, Agent, or Firm — BAKERHOSTETLER

(57) ABSTRACT

A head-mountable device can operate in concert with one or more optical assemblies thereof to provide multiple users with shared experiences and content enjoyment. Such operations can be facilitated by a connection between the head-mountable device and one or both of its optical assemblies to allow different users to receive content. Such a connection can be made possible by a communication link that directly and/or physically connects the head-mountable device and one or both of its optical assemblies when the one or both of the optical assemblies is removed from the head-mountable device for operation by a separate user. The ability to provide multiple outputs on separate components allows separate users to participate in a shared experience.

20 Claims, 5 Drawing Sheets

(56) References Cited

U.S. PATENT DOCUMENTS

| | | |
|---|---|---|
| 10,447,905 B2 | 10/2019 | O'Neill et al. |
| 2008/0186586 A1 | 8/2008 | Yamamoto |
| 2011/0239354 A1* | 10/2011 | Celona ................ A42B 3/04 2/422 |
| 2011/0249230 A1 | 10/2011 | Blum |
| 2018/0239146 A1* | 8/2018 | Bierhuizen ........ G02B 17/0856 |
| 2021/0208408 A1* | 7/2021 | Boger .................... G06F 3/011 |
| 2022/0299779 A1* | 9/2022 | Zhang ................. H05K 5/0217 |
| 2022/0299781 A1* | 9/2022 | Ran .................... G02B 27/0172 |

OTHER PUBLICATIONS

Endo, et al., "ModularHMD: A Reconfigurable Mobile Head-Mounted Display Enabling Ad-hoc Peripheral Interactions with the Real World," UIST '21, Oct. 2021, pp. 100-117.
Extended European Search Report from European Patent Application No. 23190860.9, dated Jan. 18, 2024, 8 pages.

* cited by examiner

OPTICAL ASSEMBLIES FOR SHARED EXPERIENCE

CROSS-REFERENCE TO RELATED APPLICATION

This application claims the benefit of U.S. Provisional Application No. 63/399,175, entitled "OPTICAL ASSEMBLIES FOR SHARED EXPERIENCE," filed Aug. 18, 2022, the entirety of which is incorporated herein by reference.

TECHNICAL FIELD

The present description relates generally to head-mountable devices, and, more particularly, to head-mountable devices with optical assemblies that facilitate a shared experience.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

A head-mountable device can operate in concert with one or more optical assemblies thereof to provide multiple users with shared experiences and content enjoyment. Such operations can be facilitated by a connection between the head-mountable device and one or both of its optical assemblies to allow different users to receive content. Such a connection can be made possible by a communication link that directly and/or physically connects the head-mountable device and one or both of its optical assemblies when the one or both of the optical assemblies is removed from the head-mountable device for operation by a separate user.

The burden of processing can be shared between multiple devices and/or delegated to a designated device. At least some content provided for output on the head-mountable device can be transmitted to a detached optical assembly device for output thereat. The connection can facilitate such transmission in a manner that reduces the burden of generating content and/or adapting content for output on any given display. The ability to provide multiple outputs on separate components allows separate users to participate in a shared experience.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
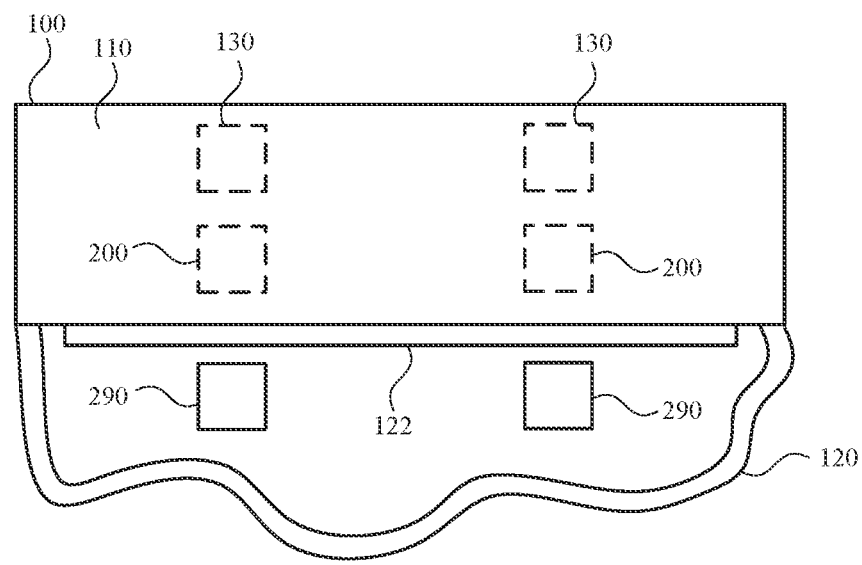
FIG. 1 illustrates a top view of a head-mountable device, according to some embodiments of the present disclosure.
Figure 2:
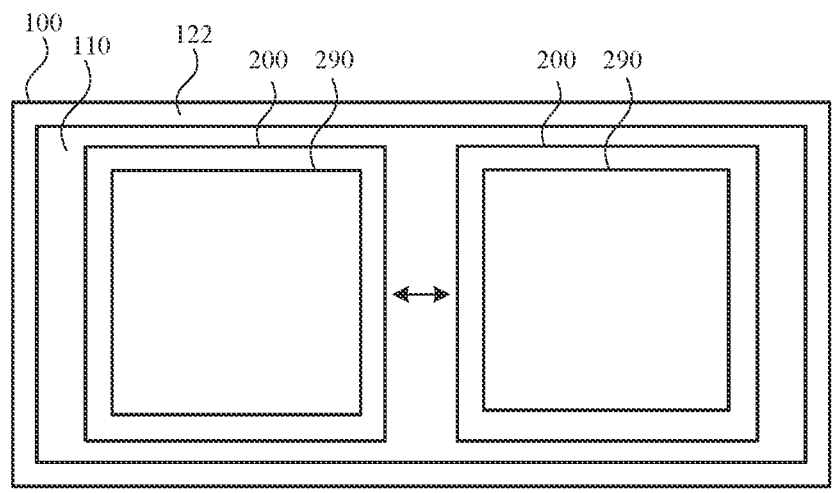
FIG. 2 illustrates a rear view of a head-mountable device, according to some embodiments of the present disclosure.

Referring to FIGS. 1 and 2, a head-mountable device 100 can include a frame 110 and a head engager 120. The frame 110 can be worn on a head of a user. The frame 110 can be positioned in front of the eyes of a user to provide information within a field of view of the user. The frame 110 can optionally provide a nosepiece to rest on a user's nose and/or other face engagement portions to rest against the user's face.

According to some embodiments, for example as shown in FIG. 1, a head-mountable device 100 includes a frame 110 and a face seal 122 that are worn on a head of a user. The frame 110 can be positioned in front of the eyes of a user to provide information within a field of view of the user. The frame 110 and/or the face seal 122 can provide a nosepiece to rest on a user's nose.

The frame 110 can be supported on a user's head with a head engager 120. The head engager 120 can wrap or extend along opposing sides of a user's head and/or to a rear of the user's head. The head engager 120 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the head engager 120 can include multiple components to engage a user's head. The head engager 120 can extend from the frame 110 and/or the face seal 122.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the face seal 122 and/or a head engager 120 of the head-mountable device 100.

While the face seal 122 is shown schematically with a particular size and shape, it will be understood that the size and shape of the face seal 122, particularly at the inner side thereof, can have a size and shape that accommodates the face of a user wearing the head-mountable device 100. For example, the face seal 122 can provide a shape that generally matches the contours of the user's face around the eyes of the user. The face seal 122 can be provided with one or more features that allow the face seal 122 to conform to the face of the user to enhance comfort and block light from entering the face seal 122 at the point of contact with the face. For example, the face seal 122 can provide a flexible, soft, elastic, and/or compliant structure. The face seal 122 can be provided with customization and adjustability so that the head-mountable device 100 is in a desired position and orientation with respect to the face and head of the user during use. The engagement of the face seal 122 with the face can prevent or limit the ingress of light from the external environment.

The head-mountable device 100 can include and/or support one or more cameras 130. The cameras 130 can be positioned on or near an outer side of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the frame 110.

The head-mountable device 100 can include optical assemblies 200 that provide visual output for viewing by a user wearing the head-mountable device 100 and/or another user. One or more optical assemblies 200 can be positioned on or near an inner side of the frame 110. As used herein, an inner side of a portion of a head-mountable device 100 is a side that faces toward the user and/or away from the external environment.

An optical assembly 200 can transmit light from a physical environment (e.g., as captured by a camera) for viewing by the user. Such a optical assembly 200 can include optical properties, such as lenses for vision correction based on incoming light from the physical environment. Additionally or alternatively, an optical assembly 200 can provide information as a display within a field of view of the user. Such information can be provided to the exclusion of a view of a physical environment or in addition to (e.g., overlaid with) a physical environment.

A physical environment relates to a physical world that people can sense and/or interact with without necessarily requiring the aid of an electronic device. A computer-generated reality environment relates to a wholly or partially simulated environment that people sense and/or interact with the assistance of an electronic device. Examples of computer-generated reality include mixed reality and virtual reality. Examples of mixed realities can include augmented reality and augmented virtuality. Some examples of electronic devices that enable a person to sense and/or interact with various computer-generated reality environments include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable device can have an integrated opaque display, have a transparent or translucent display, or be configured to accept an external opaque display (e.g., smartphone).

As shown in FIG. 2, while coupled to the frame 110, each optical assembly 200 can be adjusted to align with a corresponding eye of the user. For example, each optical assembly 200 can be moved along one or more axes until a center of each optical assembly 200 is aligned with a center of the corresponding eye. Accordingly, the distance between the displays 250 can be set and/or changed based on an inter-pupillary distance ("IPD") of the user. IPD is defined as the distance between the centers of the pupils of a user's eyes.

The head-mountable device 100 can include one or more lens assemblies 290 that each couple to a corresponding one of the optical assemblies with a relative position and orientation that is preferred for a given user. The lens assembly 290 can be or include one or more lenses for providing corrective vision capabilities.

Figure 3:
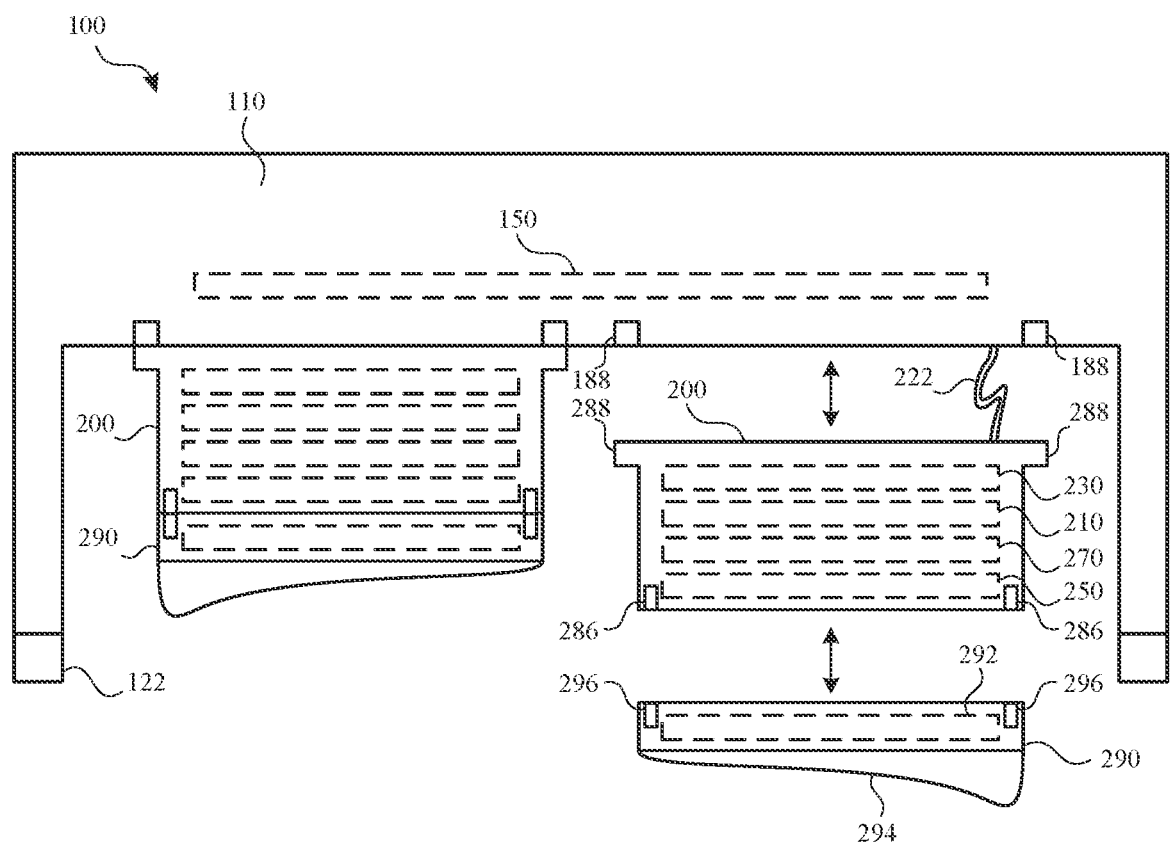
FIG. 3 illustrates a top view of a head-mountable device with one of two optical assemblies partially removed, according to some embodiments of the present disclosure.
Figure 4:
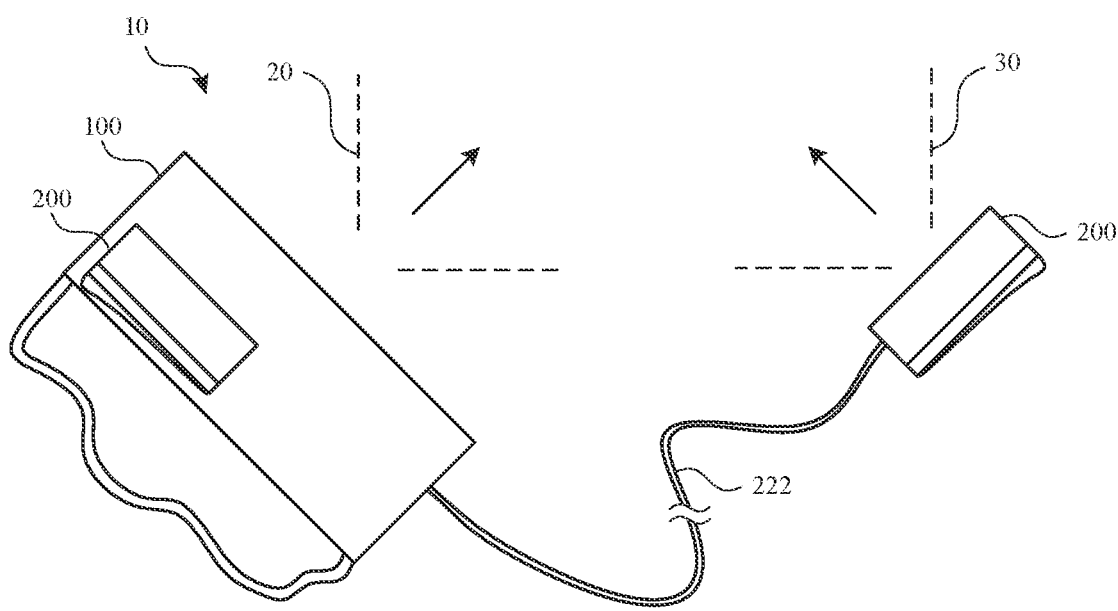
FIG. 4 illustrates a top view of the head-mountable device and optical assembly of FIG. 3 with the optical assembly separated from the head-mountable device for use while being connected to the head-mountable device by a cable, according to some embodiments of the present disclosure.

Referring now to FIGS. 3 and 4, a head-mountable device can be operated in one of multiple configurations that allow either one user or multiple separate users to wear components of the head-mountable device for optional shared experience of the outputs thereof. It will be understood that the device and system of FIGS. 3 and 4 can include any one or more of the features of the device of FIGS. 1 and 2, as described herein, even if not illustrated in FIGS. 3 and 4.

In a first configuration, as described herein, the optical assemblies 200 of the head-mountable device 100 can be coupled to the frame 110 for use by a single user. For example, each of the optical assemblies 200 can be provided to align with each of the user's two eye, thereby providing stereoscopic visual outputs to the user.

As shown in FIG. 3, components of the assembled head-mountable device 100 can be separated from other components to provide separate operation by another user. In the second configuration of the head-mountable device 100, one optical assembly 200 can provide a visual output to a first user (e.g., wearing the head-mountable device 100), and the other optical assembly 200 can provide another visual output to a second user (e.g., not wearing the head-mountable device 100). For example, the optical assembly 200 and/or the lens assembly 290 can be separated from other components for separate operation by another user.

The frame 110 of the head-mountable device 100, the optical assembly 200, and the lens assembly 290 can be securely and releasably coupled together. For example, frame engagers 188 of the frame 110 can releasably engage optical assembly engagers 288 of the optical assembly 200. By further example, lens assembly engagers 296 of the lens assembly 290 can releasably engage other optical assembly engagers 286 of the optical assembly 200. One or more of various mechanisms can be provided to secure the components to each other. For example, mechanisms such as locks, latches, snaps, slides, channels, screws, clasps, threads, magnets, pins, an interference (e.g., friction) fit, knurl presses, bayoneting, fused materials, weaves, knits, braids, hook and loop fasteners, and/or combinations thereof can be included to couple and/or secure the head-mountable device 100 together. The components can remain secured to each other until an optional release mechanism is actuated. Where applicable, the release mechanism can be provided for access by a user.

As described herein, at least some of the engagers can include magnets. As used herein, "magnet" can include a magnet of a hard magnetic material and/or a magnet of a soft magnetic material. For example, some of the magnets (e.g., of the frame engagers 188, the optical assembly engagers 288, and/or the lens assembly engagers 296) can form permanent magnets and some of the magnets can be responsive to magnetic fields. Hard magnetic materials include materials that retain their magnetism even after the removal of an applied magnetic field. Magnets that include hard magnetic material can form permanent magnets. Hard magnetic materials include neodymium (NdFeB), ferrite, AlNiCo, iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon (FeSi), steel, stainless steel, iron-aluminum-silicon, nickel-iron, ferrites, and combinations or alloys thereof. It will be recognized that "hard magnetic" and "soft magnetic" does not necessarily relate to the rigidity of the materials. It will be understood that other attachment mechanisms can be employed in addition to or as an alternative to magnets.

The optical assembly 200 can include features that facilitate separate operation while removed from the frame 110 of the head-mountable device 100. Such features can allow a separate (e.g., secondary) user to wear and/or operate the optical assembly 200 while the frame 110 is worn by a primary user.

Each optical assembly 200 can include a display 250 that provides visual outputs to a user operating the optical assembly 200. Such a display 250 can be an integrated opaque display and/or a transparent or translucent display. Such a transparent or translucent display may have a medium through which light representative of images is directed to a person's eyes. The display 250 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each optical assembly 200 can include a processor 210 (e.g., control circuitry) with one or more processing units that include or are configured to access a memory having instructions stored thereon. The processor 210 can be implemented as any electronic device capable of processing, receiving, or transmitting data or instructions. For example, the processor 210 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

Each optical assembly 200 can include a sensor 270. The sensor 270 can be positioned and arranged to detect a characteristic of the user, such as facial features. For example, such a user sensor can perform facial feature detection, facial movement detection, facial recognition, eye tracking, user mood detection, user emotion detection, voice detection, and the like. By further example, the sensor 270 can be or include an eye-tracking sensor can track features of the user wearing the head-mountable device 100, including conditions of the user's eye (e.g., focal distance, pupil size, etc.). For example, an eye sensor can optically capture a view of an eye (e.g., pupil) and determine a direction of a gaze of the user. Such eye tracking may be used to determine a location and/or direction of interest with respect to the optical assembly 200 and/or elements presented thereon. Such information can be used as the basis of outputs from the optical assembly 200 and/or the head-mountable device 100. User interface elements can then be provided on the optical assembly 200 and/or the head-mountable device 100 based on this information, for example in a region along the direction of the user's gaze or a region other than the current gaze direction, as described further herein. The detections made by the eye-tracking sensor can determine user actions that are interpreted as user inputs. Such user inputs can be used alone or in combination with other user inputs to perform certain actions. By further example, the sensor 270 can include an IMU, a depth sensor, a user input component (e.g., touch sensor, crown, touchpad, button, microphone, and the like).

Each optical assembly 200 can include a camera 230. The camera 230 can be positioned on or near an outer side of the optical assembly 200 to capture images of views external to the optical assembly 200. The captured images can be used for display to the user (e.g., on the display 250) or stored for any other purpose.

As further shown in FIG. 3, the lens assembly 290 can be or include one or more lenses 292 for providing corrective vision capabilities. It will be understood that, where multiple lenses are used, the lenses 292 of the lens assembly 290 can be provided together or separately (e.g., for combination). The one or more lenses 292 can provide one or more types of optical effects and/or vision correction. Lenses 292 can include other optical components as required to produce a desired optical effect. For example, lenses 292 can provide vision correction to light as appropriate for a given user. Such correction can be spherical, aspheric, atoric, cylindrical, single vision, multifocal, progressive, and/or adjustable. By further example, lenses 292 can include one or more diffusers, filters, polarizers, prisms, beam splitters, diffraction gratings, mirrors, and/or windows. The differences in correction or other effects among lenses 292 of different lens assemblies 290 can include variations in type of correction, diopter power, axis of correction, and the like. Various combinations of corrections can be provided with different lens assemblies 290. For example, each of the lenses 292 of any given lens assembly 290 can have a known type of correction based on the identity thereof. Corresponding identifiers, such as stock keeping units ("SKU"), can be assigned for reference and to facilitate selection of a lens assembly 290 for a given user. Accordingly, different users can use different lens assemblies 290 and/or no lens assembly 290 as desired.

For example, one lens assembly 290 can be used by one user while the corresponding optical assembly 200 is coupled to the frame 110. A different lens assembly 290 can be used by a second user while the corresponding optical assembly 200 is separated from the frame 110. Accordingly, the corresponding user can provided the appropriate lens assembly 290 when desired.

To facilitate exchange of the lens assemblies, each lens assembly 290 can further include one or more lens assembly engagers 296 (e.g., magnets). Lens assembly engagers 296 can facilitate coupling of the lens assembly 290 to the corresponding optical assembly 200 in a relative position and orientation that aligns the lens 292 of the lens assembly 290 in a preferred position and orientation relative to the display 250 of the corresponding optical assembly 200. It will be understood that such placement can allow the lens assembly 290 to be securely held in any location that places the lenses 292 within a field of view of the user and/or between the user and the display 250.

The optical assembly 200 can include or be coupled to an eye seal 294. While the eye seal 294 is shown schematically with a particular size and shape, it will be understood that the size and shape of the eye seal 294, particularly at the inner side thereof, can have a size and shape that accommodates the face of a user in the region of the eye. For example, the eye seal 294 can provide a shape that generally matches the contours of the user's face around the eye to which the optical assembly 200 is held. The eye seal 294 can be provided with one or more features that allow the eye seal 294 to conform to the face of the user to enhance comfort and block light from entering the eye seal 294 at the point of contact with the face. For example, the eye seal 294 can provide a flexible, soft, elastic, and/or compliant structure. The eye seal 294 can be provided with customization and adjustability so that the optical assembly 200 is in a desired position and orientation with respect to the face of the user during use. The engagement of the eye seal 294 with the face can prevent or limit the ingress of light from the external environment.

As further shown in FIG. 3, a cable 222 can be provided to facilitate communication between components. The cable 222 can operably connect the corresponding optical assembly 200 to the frame 110 and components thereof, such as a processor 150. For example, the cable 222 can include two or more end portions that each include mechanisms for facilitating attachment to and communication with each of multiple components. In some embodiments, the cable 222 can provide operable communication when the optical assembly 200 is coupled to the frame 110 as well as when the optical assembly 200 is separated from the frame 110. In some embodiments, the cable 222 can provide operable communication when the optical assembly 200 is separated from the frame 110, and a separate communication interface can provide operable communication when the optical assembly 200 is coupled to the frame 110. For example, the cable 222 can be provided and connected after the optical assembly 200 is separated from the frame 110. By further example, the cable 222 can include end portions that provide engagement and facilitate mechanical coupling as well as communication interfaces that facilitate a communication link. The communication interfaces can include one or more of a variety of features, such as electrical connectors, pogo pins, conductive surfaces, wireless receivers/transmitters, and/or inductive coupling features (e.g., coils) for communicably coupling to the communication interfaces. The communication interfaces can include pairs of conductive contacts that are configured to make electrical contact when the end portions are engaged with the corresponding components.

As shown in FIG. 4, the head-mountable device 100 and the optical assembly 200 can form a system 10 in which each can be operated separately, for example while worn by separate users. While connected by the cable 222, the head-mountable device 100 and the optical assembly 200 can communicate with each other and be operated in concert. Accordingly, signals can be transmitted and received by each of the head-mountable device 100 and the optical assembly 200 via the cable 222.

The cable 222 can facilitate direct connections between the head-mountable device 100 and the optical assembly 200. For example, the cable 222 can include conductive wires that transmit unmodified signals between devices, such that the signals are received at a destination device substantially as transmitted from a source device. Signals shared between the head-mountable device 100 and the optical assembly 200 while connected by the cable 222 can be related to outputs provided by both the head-mountable device 100 and the optical assembly 200. For example, the head-mountable device 100 can be operated to provide an output at the remaining optical assembly 200 thereof, and the head-mountable device 100 can output a signal via the cable 222 to the separated optical assembly 200 so it can provide a related output at the display thereof. The signal transmitted via the cable 222 can be identical to or similar to the signal used to operate the optical assembly 200.

While signals can be related to visual output provided by the display of the optical assemblies 200, it will be understood that the same or different signals transmitted by the cable 222 can relate to other content shared between the head-mountable device 100 and the optical assembly 200. For example, the cable 222 can transmit signals relating to other outputs provided by the head-mountable device 100 and the optical assembly 200, such as sound, haptic feedback, and the like. The cable 222 can transmit signals between devices without necessarily requiring related output to be provided.

It will be understood that the outputs provided by the head-mountable device 100 and the optical assembly 200 can be the same or different. For example, in some embodiments, an output (e.g., visual output) can be replicated for each of two users to observe. In some embodiments, an output (e.g., visual output) can be different for users while being related to each other, such as by providing different views of a same object (e.g., real or virtual), based on the different perspectives of the users. For example, the head-mountable device 100 can provide an output based on a field of view 20 captured by a camera thereof, and the optical assembly 200 can provide an output based on a field of view 30 captured by a camera thereof. In some embodiments, the output (e.g., visual output) of the head-mountable device 100 and the optical assembly 200 can be fully independent, for example based on the selections of the separate users, while both types of outputs are optionally managed by the head-mountable device 100.

Figure 5:
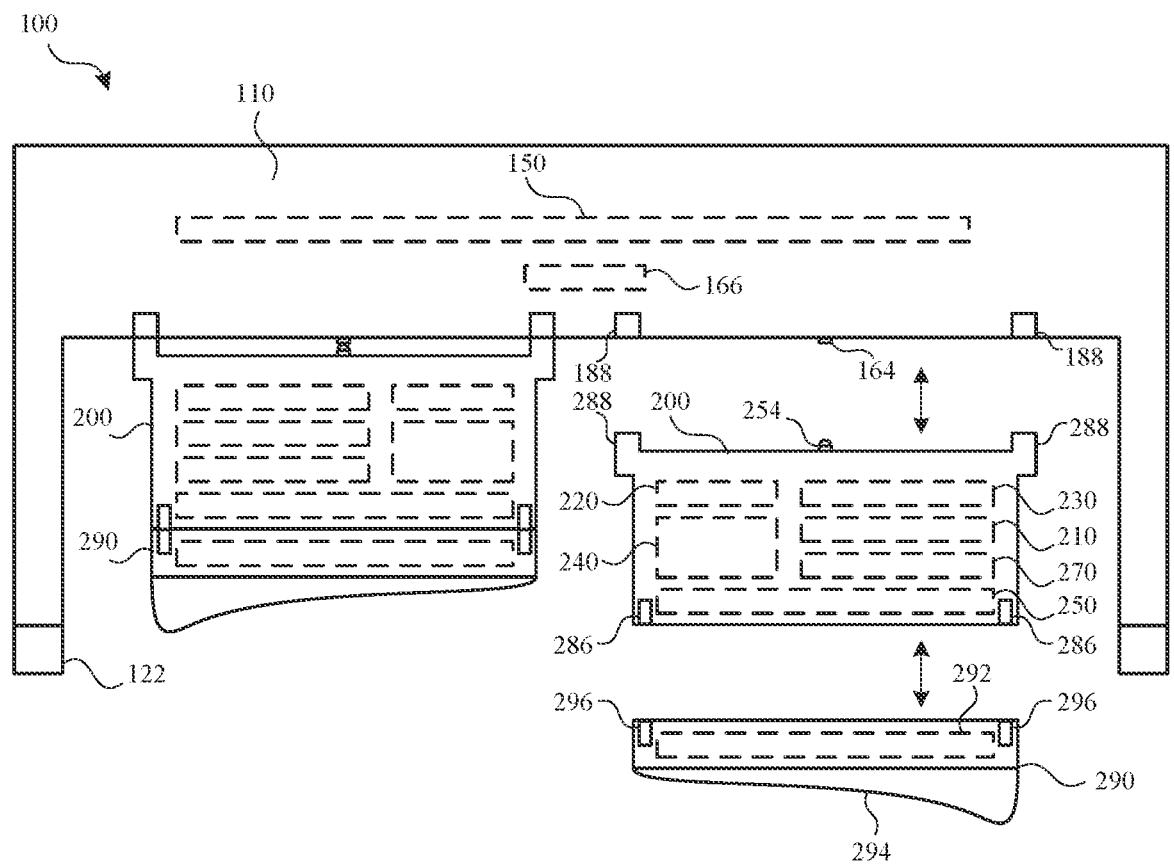
FIG. 5 illustrates a top view of a head-mountable device with one of two optical assemblies partially removed, according to some embodiments of the present disclosure.
Figure 6:
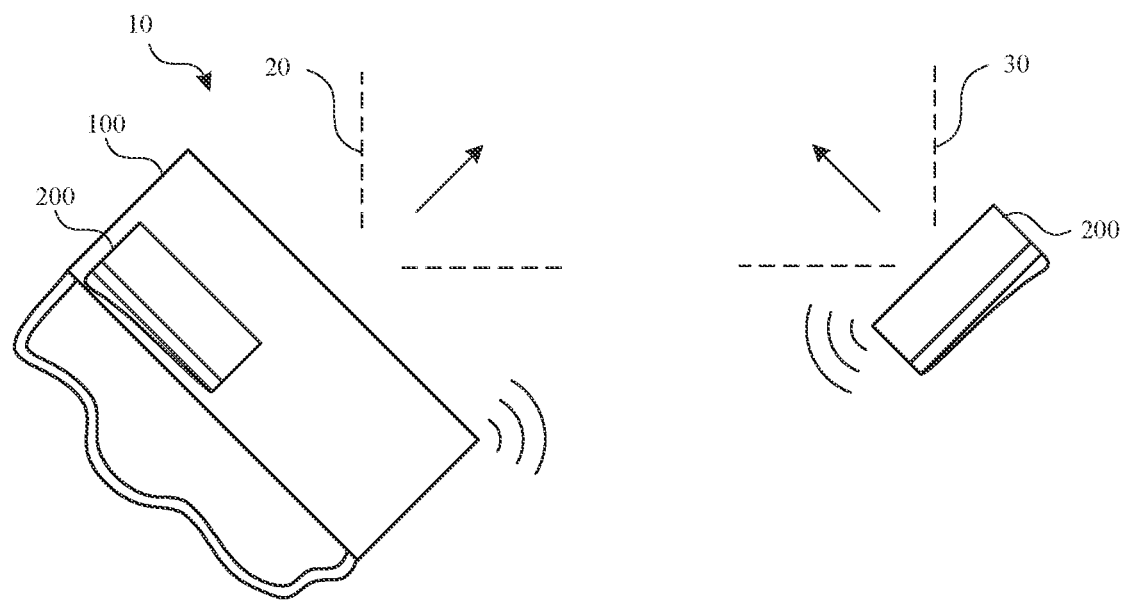
FIG. 6 illustrates a top view of the head-mountable device and optical assembly of FIG. 5 with the optical assembly separated from the head-mountable device for use while in wireless communication with the head-mountable device, according to some embodiments of the present disclosure.

Referring now to FIGS. 5 and 6, a head-mountable device can be operated in one of multiple configurations that allow either one user or multiple separate users to wear components of the head-mountable device for optional shared experience of the outputs thereof. It will be understood that the device and system of FIGS. 5 and 6 can include any one or more of the features of the devices and systems of FIGS. 1-4, as described herein, even if not illustrated in FIGS. 5 and 6.

In a first configuration, as described herein, the optical assemblies 200 of the head-mountable device 100 can be coupled to the frame 110 for use by a single user. For example, each of the optical assemblies 200 can be provided to align with each of the user's two eye, thereby providing stereoscopic visual outputs to the user.

As shown in FIG. 5, components of the assembled head-mountable device 100 can be separated from other components to provide separate operation by another user. In the second configuration of the head-mountable device 100, one optical assembly 200 can provide a visual output to a first user (e.g., wearing the head-mountable device 100), and the other optical assembly 200 can provide another visual output to a second user (e.g., not wearing the head-mountable device 100). For example, the optical assembly 200 and/or the lens assembly 290 can be separated from other components for separate operation by another user.

Operation of the optical assembly 200 can be controlled by the processor 150 of the head-mountable device 100 while the optical assembly 200 is coupled to the frame 110. The processor 150 and/or other components can be operably connected to the optical assembly 200 by one or more of a variety to connections while coupled to the frame 110. For example, one or more optical assembly connectors 254 can include an element for making an electrical connection, such as a pogo pin that is at least partially collapsible and/or a contact pad provide by the frame connector 164 of the frame 110. By further example, a pogo pin of the optical assembly connector 254 can be spring loaded and/or a contact pad of the frame connector 164 can be formed from an electrically conductive foam or elastomer. It will be understood that the arrangement of parts can be altered, for example with a pogo pin extending from the frame 110 and/or a contact pad positioned at the optical assembly 200. Such connections can be readily released upon removal of the optical assembly 200 from the frame 110.

It will be understood that the head-mountable device 100 can have one or more of the features illustrated and described herein with respect to FIGS. 3 and 4. Such features will not be described again in detail. It will nonetheless be understood that such features can optionally be provided. For example, each optical assembly 200 can include a display 250, a processor 210, a sensor 270, and/or a camera 230. For example, each optical assembly 200 can include or be coupled to a lens assembly 290.

In addition to other features, each optical assembly 200 can include features that facilitate wireless operation of the optical assembly 200. In some embodiments, each optical assembly 200 can include a battery 240 to provide power to other components of the optical assembly 200. The battery 240 can be charged while connected to the frame 110 and store power for use during separation from the frame 110.

Each optical assembly 200 can include a wireless communication interface 220 for communicating with a wireless communication interface 166 of the head-mountable device 100 (e.g., located at and/or supported by the frame 110) using any suitable communications protocol. For example, wireless communication interface 220 can support Wi-Fi (e.g., a 802.11 protocol), Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The wireless communication interface 220 can also include an antenna for transmitting and receiving electromagnetic signals. It will be understood that the wireless communication interface 220 can provide a communication link without requiring a physical connection (e.g., cable).

When the optical assembly 200 is separated from the frame 110, the communication link provided between the optical assembly connectors 254 and the frame connector 164 can be removed. At such a time, the wireless communication interface 220 of the optical assembly 200 can communicate wirelessly with the wireless communication interface 166 of the head-mountable device 100 located within and/or supported by the frame 110, which can be operatively and/or communicatively connected to other components of the head-mountable device 100, such as the processor 150.

In some embodiments, the optical assembly connectors 254 and the frame connector 164 can provide operable communication when the optical assembly 200 is coupled to the frame 110, and the wireless communication interface 220 can provide operable communication when the optical assembly 200 is separated from the frame 110. In some embodiments, the wireless communication interface 220 can provide operable communication when the optical assembly 200 is coupled to the frame 110.

As shown in FIG. 6, the head-mountable device 100 and the optical assembly 200 can form a system 10 in which each can be operated separately, for example while worn by separate users. While connected by a wireless communication link, the head-mountable device 100 and the optical assembly 200 can communicate with each other and be operated in concert. Accordingly, signals can be transmitted and received by each of the head-mountable device 100 and the optical assembly 200 via the wireless communication link.

The wireless communication link can facilitate direct connections between the head-mountable device 100 and the optical assembly 200. While signals can be related to visual output provided by the display of the optical assemblies 200, it will be understood that the same or different signals transmitted by the wireless communication link can relate to other content shared between the head-mountable device 100 and the optical assembly 200. For example, the wireless communication link can transmit signals relating to other outputs provided by the head-mountable device 100 and the optical assembly 200, such as sound, haptic feedback, and the like. The wireless communication link can transmit signals between devices without necessarily requiring related output to be provided.

It will be understood that the outputs provided by the head-mountable device 100 and the optical assembly 200 can be the same or different. For example, in some embodiments, an output (e.g., visual output) can be replicated for each of two users to observe. In some embodiments, an output (e.g., visual output) can be different for users while being related to each other, such as by providing different views of a same object (e.g., real or virtual), based on the different perspectives of the users. For example, the head-mountable device 100 can provide an output based on a field of view 20 captured by a camera thereof, and the optical assembly 200 can provide an output based on a field of view 30 captured by a camera thereof. In some embodiments, the output (e.g., visual output) of the head-mountable device 100 and the optical assembly 200 can be fully independent, for example based on the selections of the separate users, while both types of outputs are optionally managed by the head-mountable device 100.

Figure 7:
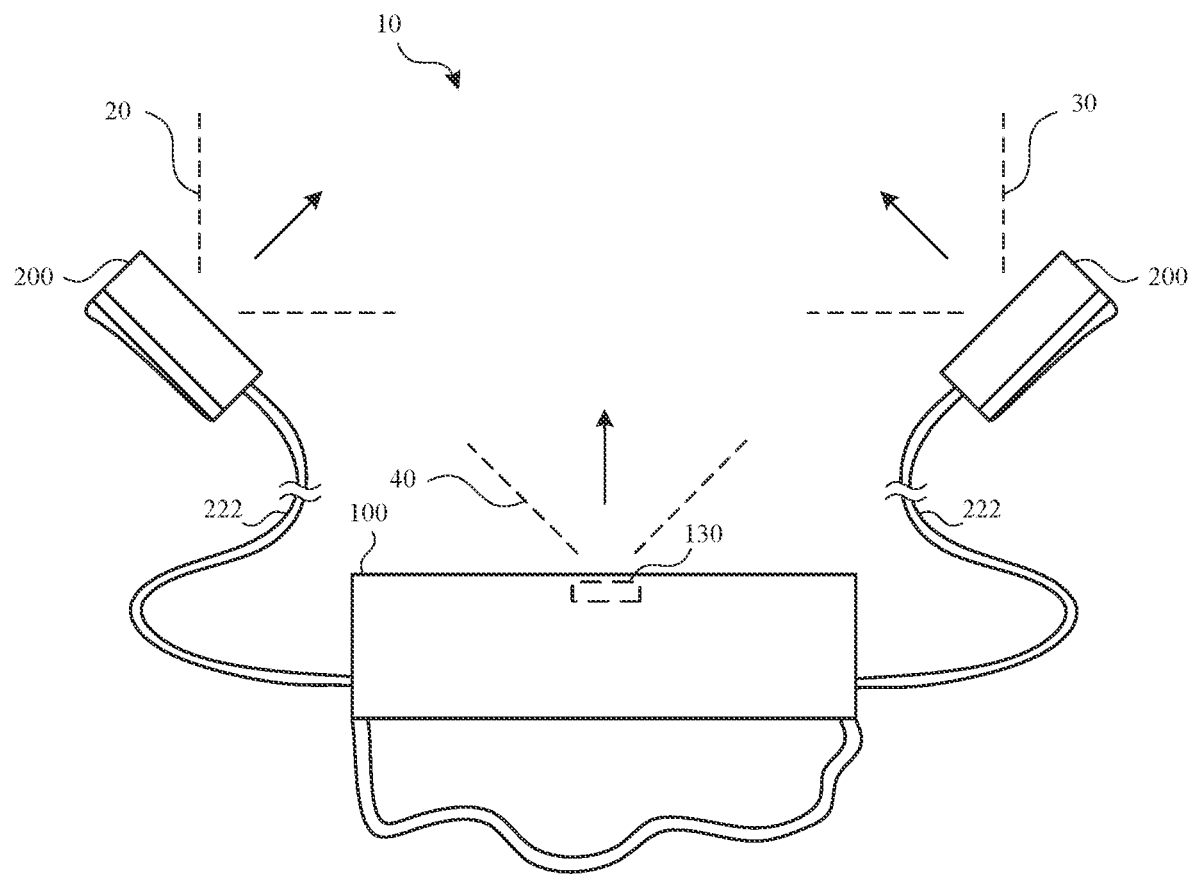
FIG. 7 illustrates a top view of a head-mountable device and optical assemblies with the optical assemblies separated from the head-mountable device for use while being connected to the head-mountable device by cables, according to some embodiments of the present disclosure.

Referring now to FIG. 7, the head-mountable device can facilitate operation with multiple users who each operate one of the optical assemblies. As shown in FIG. 7, the optical assemblies 200 can each be operated separately, for example while held or worn by separate users. Each of the optical assemblies 200 can be separated from the frame of the head-mountable device 100. The head-mountable device 100 need not be worn by any of the users. Instead, the head-mountable device 100 can operate as a base station for the optical assemblies 200. The head-mountable device 100 can provide processing and coordinate operation of the separate optical assemblies 200. In some embodiments, the head-mountable device 100 can provide additional inputs, such as by operation of a camera 130 and/or other sensor that remains on the head-mountable device while the optical assemblies 200 are deployed.

While connected by the cables 222, the head-mountable device 100 and the optical assemblies 200 can communicate with each other and be operated in concert. Accordingly, signals can be transmitted and received by each of the head-mountable device 100 and the optical assemblies 200 via the cables 222.

In some embodiments, the optical assemblies 200 can communicate with the head-mountable device 100 and/or each other via one or more cables, as described herein with respect to FIGS. 3 and 4. It will be understood that the system 10 of FIG. 7 can include any one or more features of the system, device, and components illustrated and described herein with respect to FIGS. 3 and 4.

Additionally or alternatively, the optical assemblies 200 can communicate with the head-mountable device 100 and/or each other via a wireless communication link, as described herein with respect to FIGS. 5 and 6. It will be understood that the system 10 of FIG. 7 can include any one or more features of the system, device, and components illustrated and described herein with respect to FIGS. 5 and 6.

It will be understood that the outputs provided by the optical assemblies 200 can be the same or different. For example, in some embodiments, an output (e.g., visual output) can be replicated for each of two users to observe. In some embodiments, an output (e.g., visual output) can be different for users while being related to each other, such as by providing different views of a same object (e.g., real or virtual), based on the different perspectives of the users. For example, the first optical assembly 200 can provide an output based on a field of view 20 captured by a camera thereof, and the second optical assembly 200 can provide an output based on a field of view 30 captured by a camera thereof. The operation of either can be based, at least in part, based on a first of view 40 captured by a camera 130 of the head-mountable device 100. In some embodiments, at least one of the head-mountable device 100 or one or both of the optical assemblies is within a field of view of another's camera, thereby facilitating determination of the relative position and/or orientation of the components. In some embodiments, the output (e.g., visual output) of the optical assemblies 200 can be fully independent, for example based on the selections of the separate users, while both types of outputs are optionally managed by the head-mountable device 100.

Figure 8:
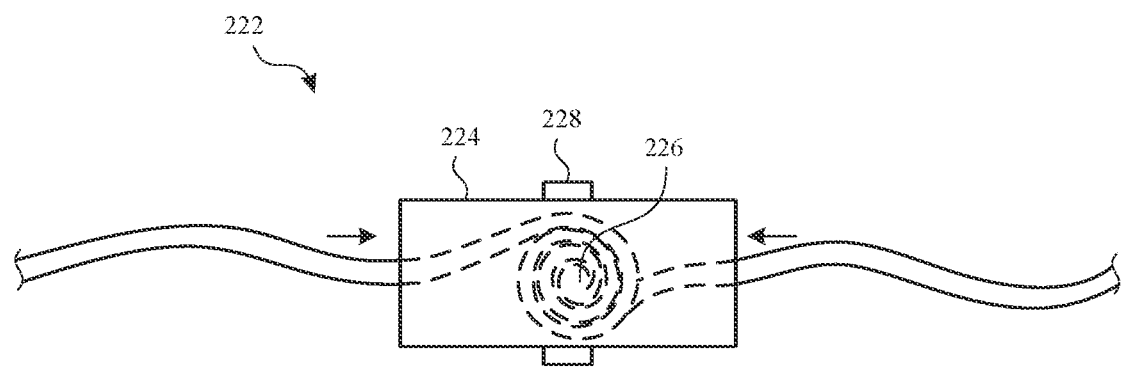
FIG. 8 illustrates a view of a cable with retraction features, according to some embodiments of the present disclosure.

Referring now to FIG. 8, one or more cables can have length control features that allow the length to the increased or decreased as desired to facilitate both the stowed and deployed positions of the optical assemblies. For example, as shown in FIG. 8, the cable 222 can include a retractor 226 along a length of the cable 222. In a retracted or partially retracted configuration, a length of the cable 222 can be at least partially retained within a housing 224. For example, the cable 222 can form a coil within a chamber of the housing 224, so that at least a portion of the cable 222 is hidden therein. The cable 222 can be biased to the retracted configuration. For example, the cable 222 can form a coil within the housing 224, and a retractor 226 (e.g., torsional spring) can apply a force that tends to retract the cable 222 to form the coil. At least a portion of the cable 222 can remain exposed for handling by a user. The housing 224 can include an engager 228, such as a button the selectively controls a pawl to release or arrest the retractor 226. Accordingly, the use can selectively control the length of the cable 222 as needed for various applications. For example, the cable 222 can be retracted while the optical assembly is coupled to the frame so that only a short length is provided and the remainder is maintained within the housing so no length of excess cable is visible or protruding. By further example, the cable 222 can be elongated to facilitate deployment of the corresponding optical assembly to another user (e.g., other than the user wearing the head-mountable device). It will be understood that the cable 222 can be provided with any length to facilitate operation by different users at any relative distance from each other. For example, the cable 222 can be 1 meter, 2 meters, 3 meters, 4 meters, 5 meters, 6 meters, 7 meters, 8 meters, 9 meters, 10 meters, or greater than 10 meters long in a fully deployed (e.g., elongated) configuration.

Figure 9:
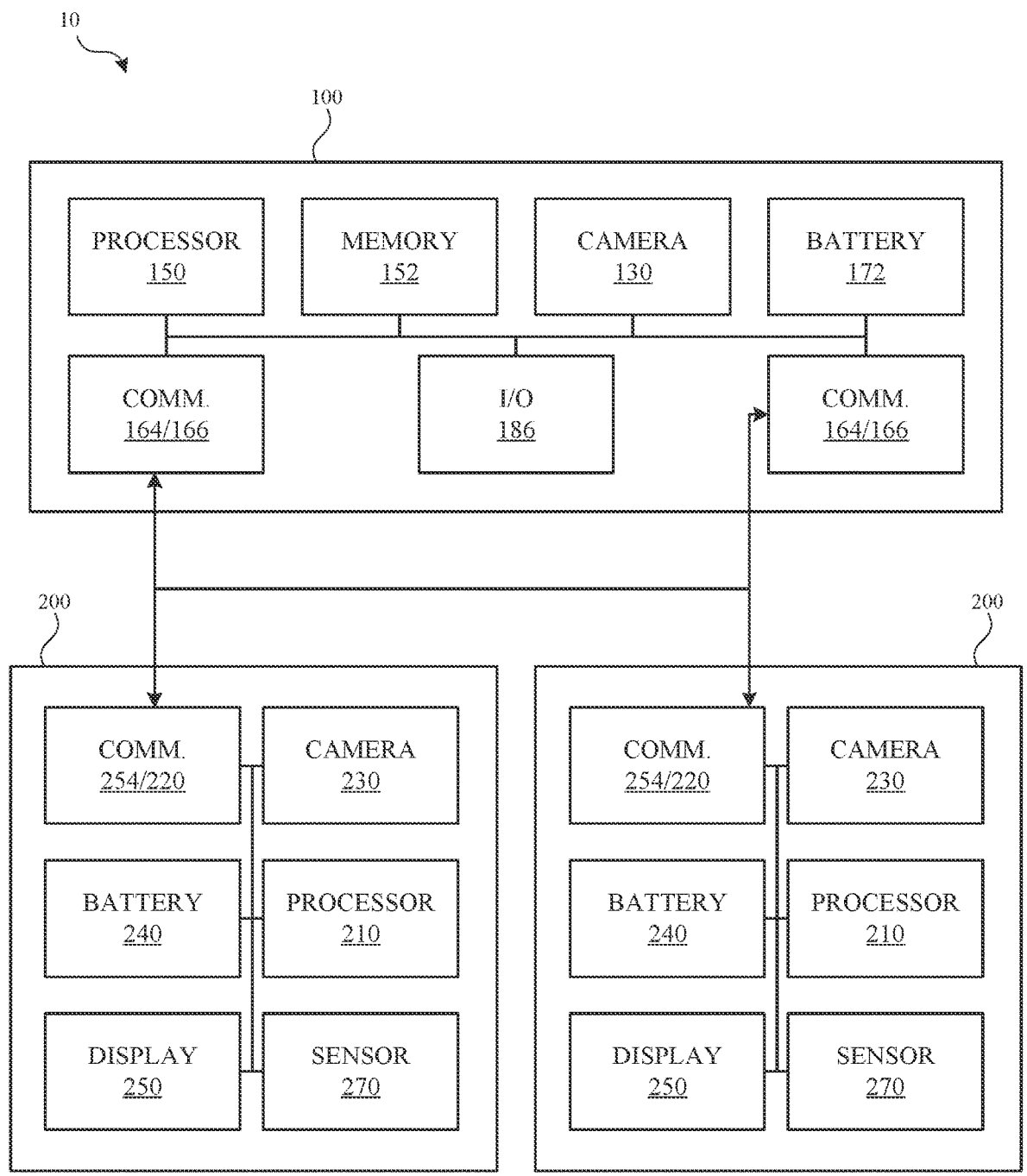
FIG. 9 illustrates a block diagram of a head-mountable device, in accordance with some embodiments of the present disclosure.

Referring now to FIG. 9, components of the head-mountable device can be operably connected to provide the performance described herein. FIG. 9 shows a simplified block diagram of an illustrative head-mountable device 100 in accordance with one embodiment of the invention. It will be appreciated that components described herein can be provided on one, some, or all of a frame, a light seal, an optical assembly, a lens assembly, and/or a head engager. It will be understood that additional components, different components, or fewer components than those illustrated may be utilized within the scope of the subject disclosure.

As shown in FIG. 9, the head-mountable device 100 can include a processor 150 (e.g., control circuitry) with one or more processing units that include or are configured to access a memory 152 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processor can be a component of and/or operably connected to the control board and/or another component of the head-mountable device.

The memory 152 can store electronic data that can be used by the head-mountable device 100. For example, the memory 152 can store electrical data or content such as, for example, audio and video files, documents and applications, device settings and user preferences, timing and control signals or data for the various modules, data structures or databases, and so on. The memory 152 can be configured as any type of memory. By way of example only, the memory 152 can be implemented as random access memory, read-only memory, Flash memory, removable memory, or other types of storage elements, or combinations of such devices.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, touchpad, crown, microphone, mouse, gesture tracking sensor, and/or another feature that can act to detect inputs for operation by the user. The input/output component 186 can include speakers, haptic feedback devices, and/or another feature that can act to provide outputs to the user.

The head-mountable device 100 can include communications circuitry, such as the frame connector 164 and/or the wireless communication interface 166 for communicating with one or more servers or other devices using any suitable communications protocol. For example, communications circuitry can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof.

Communications circuitry can also include an antenna for transmitting and receiving electromagnetic signals.

The head-mountable device 100 can include a battery 172, which can charge and/or power components of the head-mountable device 100. The battery 172 can also charge and/or power components connected to the head-mountable device 100 (e.g., the optical assemblies 200).

As further shown in FIG. 9, the optical assemblies 200 can each include electronic components described herein. Such components can include a processor 210, a camera 230, a battery 240, a display 250, and/or a sensor 270. It will be understood that a greater or fewer number of components can be included.

The optical assemblies 200 can include optical assembly connectors 254 and/or wireless communication interfaces 220 for communicating with the head-mountable device 100 and/or each other. Such communication can optionally be facilitated by one or more cables, as described herein. Accordingly, each of the optical assemblies 200 can be operably connected to the head-mountable device 100 and to each other. Accordingly, every component of the head-mountable device 100 can be operably connected to every component of each of the optical assemblies 200.

Accordingly, embodiments of the present disclosure provide a head-mountable device that can operate in concert with one or more optical assemblies thereof to provide multiple users with shared experiences and content enjoyment. Such operations can be facilitated by a connection between the head-mountable device and one or both of its optical assemblies to allow different users to receive content. Such a connection can be made possible by a communication link that directly and/or physically connects the head-mountable device and one or both of its optical assemblies when the one or both of the optical assemblies is removed from the head-mountable device for operation by a separate user. The ability to provide multiple outputs on separate components allows separate users to participate in a shared experience.

Various examples of aspects of the disclosure are described below as clauses for convenience. These are provided as examples, and do not limit the subject technology.

Clause A: a head-mountable device comprising: a frame; a frame engager; a first optical assembly supported by the frame, the first optical assembly comprising a first display; a processor; a cable; and a second optical assembly releasably coupled to the frame, the second optical assembly comprising: a second optical assembly engager configured to releasably couple the second optical assembly to the frame by engaging the frame engager; and a second display operably coupled to the processor by the cable when the second optical assembly is released from the frame.

Clause B: a head-mountable device comprising: a frame; a frame engager; a first optical assembly supported by the frame, the first optical assembly comprising a first display; a first wireless communication interface; and a second optical assembly releasably coupled to the frame, the second optical assembly comprising: a second optical assembly engager configured to releasably couple the second optical assembly to the frame by engaging the frame engager; a second display; a battery; and a second wireless communication interface for communicating with the first wireless communication interface.

Clause C: a head-mountable device comprising: a frame; a head engager for securing the frame to a head; a processor; a first cable; a second cable; a first frame engager; a second frame engager; a first optical assembly releasably coupled to the frame by the first frame engager, the first optical assembly comprising a first display operably coupled to the processor by the first cable when the first optical assembly is released from the first frame engager; and a second optical assembly releasably coupled to the frame by the second frame engager, the second optical assembly comprising a second display operably coupled to the processor by the second cable when the second optical assembly is released from the second frame engager.

One or more of the above clauses can include one or more of the features described below. It is noted that any of the following clauses may be combined in any combination with each other, and placed into a respective independent clause, e.g., clause A, B, or C.

Clause 1: the second optical assembly further comprises an eye sensor for detecting a characteristic of an eye.

Clause 2: the second optical assembly further comprises a camera on a side of the second optical assembly that is opposite the second display.

Clause 3: a head engager for securing the frame to a head; and a light seal supported by the frame and configured to conform to a face.

Clause 4: a lens assembly comprising a lens adjacent to the second display.

Clause 5: the lens assembly further comprises a lens assembly engager configured to releasably couple the lens assembly to the second optical assembly by engaging an additional second optical assembly engager.

Clause 6: the lens assembly further comprises an eye seal configured to conform to a region of a face that is about an eye.

Clause 7: the cable comprises a retractor configured to controllably retract a length of the cable within a housing.

Clause 8: a frame connector supported by the frame, wherein the second optical assembly comprises an optical assembly connector operably connected to the frame connector when the second optical assembly is coupled to the frame.

Clause 9: a lens assembly comprising: a lens adjacent to the second display; and a lens assembly engager configured to releasably couple the lens assembly to the second optical assembly by engaging an additional second optical assembly engager.

Clause 10: a head engager for securing the frame to a head; and a light seal supported by the frame and configured to conform to a face, wherein the lens assembly further comprises an eye seal configured to conform to a region of the face that is about an eye.

Clause 11: the first optical assembly further comprises a first camera on a side of the first optical assembly that is opposite the first display; the second optical assembly further comprises a second camera on a side of the second optical assembly that is opposite the second display; and the head-mountable device further comprises a third camera supported by the frame.

Clause 12: the first optical assembly further comprises a first eye sensor for detecting a characteristic of a first eye; and the second optical assembly further comprises a second eye sensor for detecting a characteristic of a second eye.

Clause 13: a light seal supported by the frame and configured to conform to a face.

Clause 14: a first lens assembly releasably coupled to the first optical assembly and comprising a first lens adjacent to the first display; and a second lens assembly releasably coupled to the second optical assembly and comprising a second lens adjacent to the second display.

As described above, one aspect of the present technology may include the gathering and use of data. The present disclosure contemplates that in some instances, this gathered data may include personal information or other data that uniquely identifies or can be used to locate or contact a specific person. The present disclosure contemplates that the entities responsible for the collection, disclosure, analysis, storage, transfer, or other use of such personal information or other data will comply with well-established privacy policies and/or privacy practices. The present disclosure also contemplates embodiments in which users can selectively block the use of or access to personal information or other data (e.g., managed to minimize risks of unintentional or unauthorized access or use).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame;
   a frame engager disposed at the frame;
   a first optical assembly releasably coupled to the frame in a first configuration of the head-mountable device, the first optical assembly comprising a first display;
   a processor supported by the frame, wherein the first display is operably coupled to the processor;
   a cable; and
   a second optical assembly, wherein, in the first configuration, the first optical assembly and the second optical assembly are releasably coupled to the frame for use by a single user, the second optical assembly comprising:
      a second optical assembly engager configured to releasably couple the second optical assembly to the frame by engaging the frame engager; and
      a second display operably coupled to the processor by the cable when the second optical assembly is released from the frame, wherein, in a second configuration of the head-mountable device, the first optical assembly is configured to provide a first visual output to a first user and the second optical assembly is configured to provide a second visual output to a second user.

2. The head-mountable device of claim 1, wherein the second optical assembly further comprises an eye sensor for detecting a characteristic of an eye.

3. The head-mountable device of claim 1, wherein the second optical assembly further comprises a camera on a side of the second optical assembly that is opposite the second display.

4. The head-mountable device of claim 1, further comprising:
   a head engager for securing the frame to a head; and
   a light seal supported by the frame and configured to conform to a face.

5. The head-mountable device of claim 1, further comprising a lens assembly comprising a lens adjacent to the second display.

6. The head-mountable device of claim 5, wherein the lens assembly further comprises a lens assembly engager configured to releasably couple the lens assembly to the second optical assembly by engaging an additional second optical assembly engager.

7. The head-mountable device of claim 5, wherein the lens assembly further comprises an eye seal configured to conform to a region of a face that is about an eye.

8. The head-mountable device of claim 1, wherein the cable comprises a retractor configured to controllably retract a length of the cable within a housing.

9. A head-mountable device comprising:
   a frame;
   a frame engager disposed at the frame;
   a first optical assembly releasably coupled to the frame in a first configuration of the head-mountable device, the first optical assembly comprising a first display;
   a first wireless communication interface supported by the frame; and
   a second optical assembly, wherein, in the first configuration, the first optical assembly and the second optical assembly are releasably coupled to the frame for use by a single user, the second optical assembly comprising:
      a second optical assembly engager configured to releasably couple the second optical assembly to the frame by engaging the frame engager;
      a second display;
      a battery; and
      a second wireless communication interface for communicating with the first wireless communication interface, wherein, in a second configuration of the head-mountable device, the first optical assembly is configured to provide a first visual output to a first user and the second optical assembly is configured to provide a second visual output to a second user.

10. The head-mountable device of claim 9, wherein the second optical assembly further comprises an eye sensor for detecting a characteristic of an eye.

11. The head-mountable device of claim 9, wherein the second optical assembly further comprises a camera on a side of the second optical assembly that is opposite the second display.

12. The head-mountable device of claim 9, further comprising:
    a head engager for securing the frame to a head; and
    a light seal supported by the frame and configured to conform to a face.

13. The head-mountable device of claim 9, further comprising a frame connector supported by the frame, wherein the second optical assembly comprises an optical assembly connector operably connected to the frame connector when the second optical assembly is coupled to the frame.

14. The head-mountable device of claim 9, further comprising a lens assembly comprising:
a lens adjacent to the second display; and
a lens assembly engager configured to releasably couple the lens assembly to the second optical assembly by engaging an additional second optical assembly engager.

15. The head-mountable device of claim 14, further comprising:
a head engager for securing the frame to a head; and
a light seal supported by the frame and configured to conform to a face,
wherein the lens assembly further comprises an eye seal configured to conform to a region of the face that is about an eye.

16. A head-mountable device comprising:
a frame;
a head engager for securing the frame to a head;
a processor supported by the frame;
a first cable;
a second cable;
a first frame engager disposed at the frame;
a second frame engager disposed at the frame;
a first optical assembly releasably coupled to the frame by the first frame engager in a first configuration of the head-mountable device, the first optical assembly comprising a first display operably coupled to the processor by the first cable when the first optical assembly is released from the first frame engager in a second configuration of the head-mountable device; and
a second optical assembly releasably coupled to the frame by the second frame engager in the first configuration of the head-mountable device, the second optical assembly comprising a second display operably coupled to the processor by the second cable when the second optical assembly is released from the second frame engager in the second configuration of the head-mountable device,
wherein:
in the first configuration, the first optical assembly and the second optical assembly are releasably coupled to the frame for use by a single user, and
in the second configuration, the first optical assembly is configured to provide a first visual output to a first user and the second optical assembly is configured to provide a second visual output to a second user.

17. The head-mountable device of claim 16, wherein:
the first optical assembly further comprises a first camera on a side of the first optical assembly that is opposite the first display;
the second optical assembly further comprises a second camera on a side of the second optical assembly that is opposite the second display; and
the head-mountable device further comprises a third camera supported by the frame.

18. The head-mountable device of claim 16, wherein:
the first optical assembly further comprises a first eye sensor for detecting a characteristic of a first eye; and
the second optical assembly further comprises a second eye sensor for detecting a characteristic of a second eye.

19. The head-mountable device of claim 16, further comprising a light seal supported by the frame and configured to conform to a face.

20. The head-mountable device of claim 16, further comprising:
a first lens assembly releasably coupled to the first optical assembly and comprising a first lens adjacent to the first display; and
a second lens assembly releasably coupled to the second optical assembly and comprising a second lens adjacent to the second display.

* * * * *